(12) United States Patent
Pastrana

(10) Patent No.: US 12,021,801 B2
(45) Date of Patent: Jun. 25, 2024

(54) COMPUTERIZED TIME-BASED RESPONSE METHOD FOR USERS OF ELECTRONIC TEXT MESSAGES AND EMAILS TO AUTOMATICALLY CATEGORIZE AND SEND USER-CUSTOMIZED ELECTRONIC TEXT AND EMAIL RESPONSES BASED ON RESPONDENT'S REPLY TIMES AND USER-DEFINED TIME-BASED SCALES

(71) Applicant: Joseph Carlo Pastrana, Sneads Ferry, NC (US)

(72) Inventor: Joseph Carlo Pastrana, Sneads Ferry, NC (US)

( * ) Notice: Subject to any disclaimer, the term of this patent is extended or adjusted under 35 U.S.C. 154(b) by 0 days.

(21) Appl. No.: 18/092,371

(22) Filed: Jan. 2, 2023

(65) Prior Publication Data

US 2023/0155965 A1     May 18, 2023

(51) Int. Cl.
*H04L 51/02*     (2022.01)
*H04L 51/04*     (2022.01)

(52) U.S. Cl.
CPC .............. *H04L 51/02* (2013.01); *H04L 51/04* (2013.01)

(58) Field of Classification Search
CPC ................................ H04L 51/02; H04L 51/04
See application file for complete search history.

(56) References Cited

U.S. PATENT DOCUMENTS

| | | | | |
|---|---|---|---|---|
| 2004/0243679 | A1* | 12/2004 | Tyler | G06Q 10/107 709/206 |
| 2009/0037532 | A1* | 2/2009 | Estrada | H04L 51/214 709/205 |

* cited by examiner

*Primary Examiner* — Soe Hlaing

(57) ABSTRACT

A computerized time-based electronic text and email response method for electronic text and email users to automatically categorize and send user-customized text and email responses based on respondents' reply times and user-defined time-based scales. Through the use of user-defined time-based scales and reply time values, the method continuously evaluates, scores, and categorizes the texting and email replies of respondents, and automatically provides the said respondents with user-customized response messages that are correlated to their reply times. The method selects a message from a library of user-categorized messages and sends the said selected message with a score value to the respondent and a copy of the message to the user. The score values are provided to users and respondents to identify reply time issues, provide a measured level of message responsiveness, and assess the communication performance of people and organizations.

10 Claims, 4 Drawing Sheets

Example of method's installation sequence and user's utilization (Steps 1-7).

Fig. 1 Example of method's installation sequence and user's utilization (Steps 1-7).
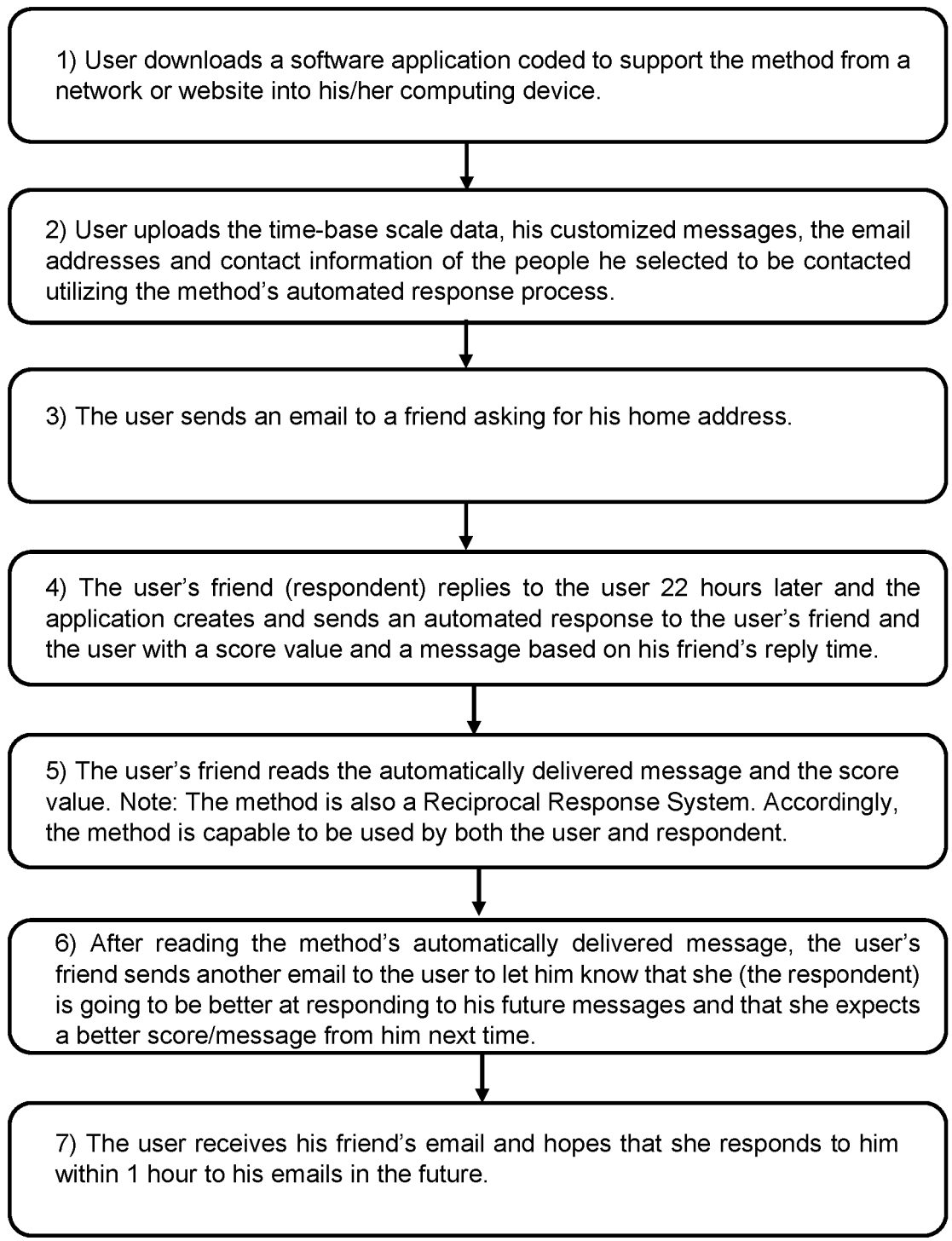

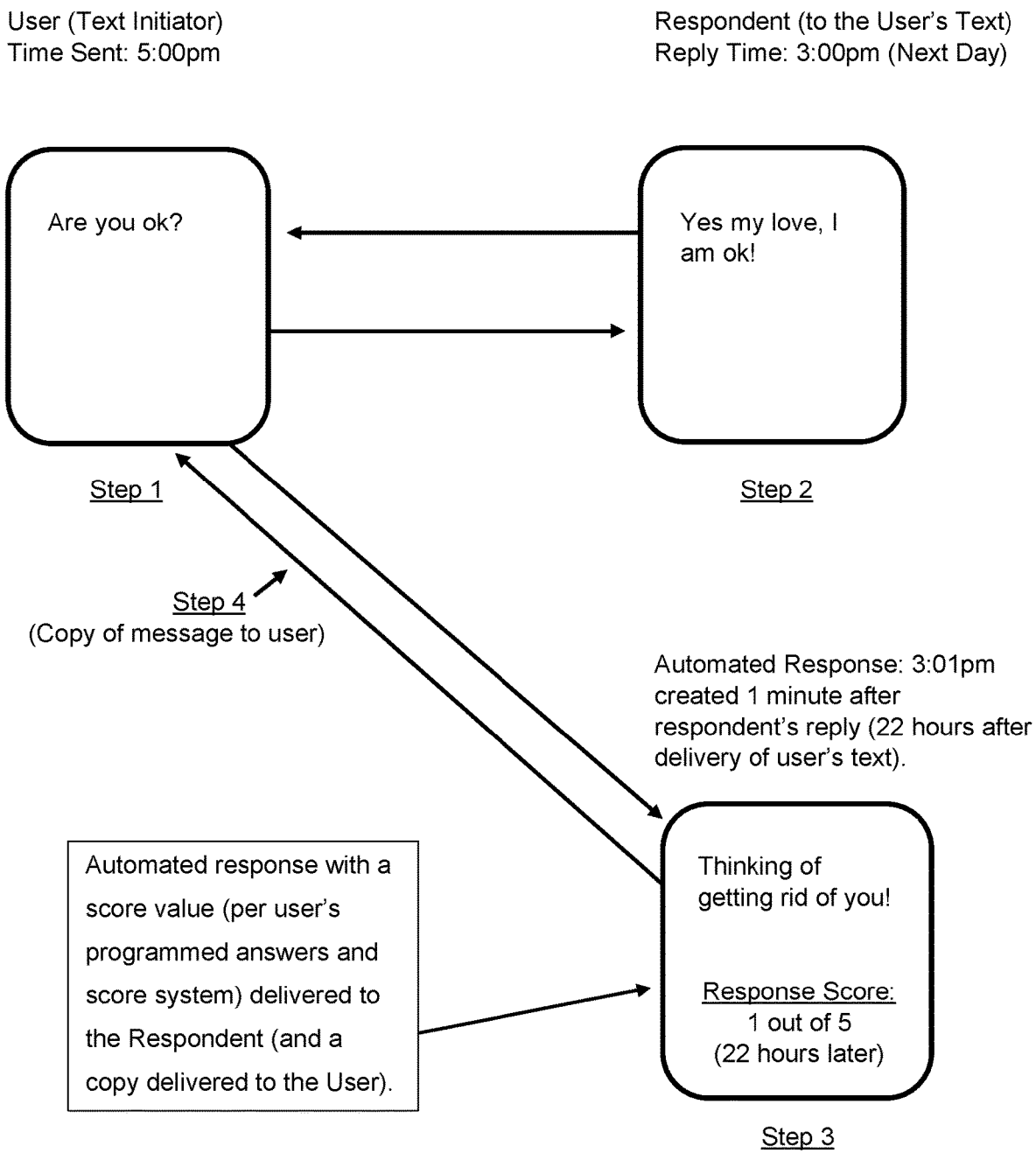
Fig. 2 - Text messages depicted on the user's and respondent's cell phones.

Fig. 3 – Example of people (private use) using the method with their own created messages. Table depicts user-defined categories, score system, time ranges, and respondents' score.

| Current Respondents' Category and Score | Friend's Name | Start Date | Last Entry | Category & Score Utilized (User Defined) |
|---|---|---|---|---|
| "I am so getting rid of you!"<br><br>Your Score: 0 of 5 | Joan | 02/20/2019 | 11/14/2022 | "Always the Greatest!"<br><br>Score 5 of 5 when reply time is received less than 10 minutes after the receipt of user's message. |
| "Always the Greatest!"<br><br>Your Score: 5 of 5 | Mary | 05/07/2017 | 11/19/2022 | "You are Good!"<br><br>Score 4 of 5 when reply time is received between 10 minutes and <1 hours after the receipt of user's message. |
| "You're no longer ok"<br><br>Your Score: 2 of 5 | John | 11/03/2021 | 12/10/2022 | "You're Kinda ok"<br><br>Score 3 of 5 when reply time is received between 1 hours and <3 hours after the receipt of user's message. |
| "Thinking of getting rid of you!"<br><br>Your Score: 1 of 5 | Sue | 07/29/2020 | 12/01/2022 | "You're no longer ok"<br><br>Score 2 of 5 when reply time is received between 3 hours and <6 hours after the receipt of user's message. |
| "You are Good!"<br><br>Your Score: 4 of 5 | Peter | 10/30/2018 | 12/17/2022 | "Thinking of getting rid of you!"<br><br>Score 1 of 5 when reply time is received between 6 hours and <48 hours after the receipt of user's message. |
| "You're Kinda ok"<br><br>Your Score: 3 of 5 score! | Linda | 07/30/2019 | 12/11/2022 | "I am so getting rid of you!"<br><br>Score 0 of 5 when reply time is received more than 48 hours after the receipt of user's message. |

Fig. 4 – Example of a Business Utilizing the Method to Evaluate Employees' Reply Times.

| Current Respondents' Category and Score (Monthly Report) | Employee Name | Start Date | Last Entry | Category-Score Used (Manager-Defined) |
|---|---|---|---|---|
| "Average"<br><br>Your Score: 3 of 5 (Counter: 1,228) | Joan | 02/20/2019 | 11/14/2022 | "Greatest"<br><br>Score 5 of 5 when reply time is received less than 10 minutes after receipt of customer's message. |
| "Good"<br><br>Your Score: 4 of 5 (Counter: 2,551) | Mary | 05/07/2017 | 11/19/2022 | "Good"<br><br>Score 4 of 5 when reply time is received between 10 minutes and <1 hours after the receipt of customer's message. |
| "Poor"<br><br>Your Score: 2 of 5 (Counter: 104) | John | 11/03/2021 | 12/10/2022 | "Average"<br><br>Score 3 of 5 when reply time is received between 1 hours and <3 hours after the receipt of customer's message. |
| "Greatest"<br><br>Your Score: 5 of 5 (Counter: 6,724) | Sue | 07/29/2020 | 12/01/2022 | "Poor"<br><br>Score 2 of 5 when reply time is received between 3 hours and < 1 day after the receipt of customer's message. |
| "Needs Immediate Attention"<br><br>Your Score: 1 of 5 (Counter: 71) | Peter | 10/30/2018 | 12/17/2022 | "Needs Immediate Attention"<br><br>Score 1 of 5 when reply time is received between 1 Day and <10 days after the receipt of customer's message. |
| "Consider Dismissal"<br><br>Your Score: 0 of 5 (Counter: 88) | Linda | 07/30/2019 | 12/11/2022 | "Consider Dismissal!"<br><br>Score 0 of 5 when reply time is received 10 days or more after the receipt of customer's message. |

COMPUTERIZED TIME-BASED RESPONSE METHOD FOR USERS OF ELECTRONIC TEXT MESSAGES AND EMAILS TO AUTOMATICALLY CATEGORIZE AND SEND USER-CUSTOMIZED ELECTRONIC TEXT AND EMAIL RESPONSES BASED ON RESPONDENT'S REPLY TIMES AND USER-DEFINED TIME-BASED SCALES

CROSS-REFERENCE TO RELATED APPLICATIONS

Not applicable to this application

FEDERALLY SPONSORED RESEARCH OR DEVELOPMENT

Not applicable to this application

SEQUENCE LISTING, A TABLE, OR A COMPUTER PROGRAM LISTING

Not applicable to this application

COMPACT DISK APPENDIX

Not applicable to this application

STATEMENT REGARDING PRIOR DISCLOSURES BY THE INVENTOR

Not applicable to this application

BACKGROUND OF THE INVENTION

The technical field of the invention relates to the electronic text message and email applications operated by computer information systems and portable computing devices, such as a laptop, tablet, iPad, cellular telephone, networks, or the like. More particularly, the present invention relates to the field of electronic text message and email communication, and how to assess and evaluate electronic communication issues pertaining to respondents' reply times. For example, when a computing device user sends an email to a co-worker, the co-worker may take an unreasonable amount of time (e.g. a month) to respond to the user's email, possibly affecting an organization's customer service performance. In short, a long reply time could negatively affect business performance.

The long response time to electronic messages, and the absence of user-driven, user-customized message monitoring systems still a present condition in business organizations, affecting workers' performance as well as people's personal relationships. Accordingly, improving response time to electronic text messages and emails remain highly desirable.

DESCRIPTION OF PRIOR ART

Not applicable to this application

BRIEF SUMMARY OF THE INVENTION

The invention consists of a computerized time-based electronic text and email response method for electronic text and email users to automatically categorize and send user-customized text and email responses based on respondents' reply time and user-defined time-based scales. Through the use of a user-defined scale and respondents' reply time values, the method continuously evaluates, scores, and categorizes the texting and email replies of respondents, and automatically provides the said respondents with user-customized response messages that are correlated to their reply times. The method selects a message, correlated to the obtained score value, from a library of user-categorized messages and sends the selected message with a score value to the respondent and a copy of the message to the user. The score values are provided to the users and respondents to identify reply time issues, provide a measured level of message responsiveness, and assess the communication performance of people and organizations.

The time-based electronic text message and email response method comprises of a user operating a computing device connected to a computer network with the capabilities to send and receive electronic text messages and emails. The said computing device operates a software application capable of processing the method's instructions. The user creates and defines a scale, an alpha and/or numeric based scoring system, and a set of customized electronic text and email responses/messages to be stored into his/her computing device. The said responses/messages are categorized and correlated to a score system based on respondent's reply time and sent to respondents with a score value. The method can be programmed by the user to be respondent specific, and thus, provide every respondent with different responses/messages and score values based on different User-Defined Time-Based Scales and the respondent's reply time.

BRIEF DESCRIPTION OF THE SEVERAL VIEWS OF THE DRAWINGS

The following figures (FIG. 1, FIG. 2, FIG. 3, FIG. 4) are included to illustrate certain aspects of the invention and should not be viewed as exclusive embodiments. The subject matter disclosed is capable of considerable modification, alteration, and equivalents in form and function, as will occur to one having ordinary skill in the art and the benefit of this disclosure.

FIG. 1 (Sheet 1 of 4) is a sequence diagram illustrating an operation sequence according to the user interface with his/her computer device to install and operate the method's software application.

FIG. 2 (Sheet 2 of 4) depicts three (3) electronic text messages created during a texting exchange between a user and his acquaintance (respondent). The communication exchange is performed via the user's cell phone and his acquaintance's cell phone. In the depiction, the user sends a text (Step 1) to his acquaintance at 5:00 pm and the respondent (the user's acquaintance) replies to the user's text 22 hours later (Step 2, next day). Since the automated response process was programmed by the user to utilize the "Thinking of getting rid of You" message category when a respondent's reply is received between 6 hours and 48 hours after the user's texting transmittal (see FIG. 3, $5^{th}$ column), and since the respondent replied 22 hours later, the respondent receives an automated message (computer generated) with a score of 1 of 5 (Step 3). Also, a copy of the message (computer generated) received by the acquaintance is received by the user (Step 4).

FIG. 3 (Sheet 3 of 4) depicts, as an example, a table containing respondents' scores, user-defined categories, score system (1-5 Score Range), time ranges, and provides the correlation between the score system, time ranges, and the user-categorized messages. Hence, the table portrays user-defined message categories, time ranges and scores to be applied to his friends only.

FIG. 4 (Sheet) depicts, as an example in a business setting, a table containing employees' scores, a manager-defined category, a score system (1-5 Score Range), time ranges, and provides the correlation between the score system, time ranges, and the manager-categorized messages. Hence, the table portrays the manager-defined message categories, time ranges and scores to be applied to his employees only.

DETAILED DESCRIPTION OF THE INVENTION

The following description of the embodiment of the invention is not intended to limit the invention, but rather to enable any person skilled in the art to make and use this invention. The subject matter disclosed is capable of considerable modification, alteration, and equivalents in form and function, as will occur to one having ordinary skill in the art and the benefit of this disclosure and it is to be accorded the widest scope consistent with the principles and features disclosed herein. The term "Computing Device" is used in this patent application to refer to portable computing devices and non-portable computers. Accordingly, the following terminology and description of the invention is provided.

For simplicity purposes, in this patent application, the term "User" is used to define a person who utilizes this method through a computing device to electronically communicate via texting and/or email with another person, and who requires the addressee (a "respondent") to reply to his/her electronic message with an electronic text message and/or email. The term "Respondent" refers to the person (addressee) who responds to a user's message with electronic text messages and/or with emails, and where the respondent is the user's addressee. The term "Respondent-Specific" refers to a message, an action or instruction explicitly designed for a particular respondent.

The term "Automated Response Process" refers to the invention's function and hence, a computerized time-based response method for users of electronic text messages and emails to automatically categorize and send user-customized electronic text and emails responses based on respondents' reply times and user-defined time-based scales. The term "Method" refers to the invention described in this patent application. The term "Reciprocal Response System" refers to the method's capability to be used by everyone (e.g. the user and respondent), wherein the user can also be a respondent, and the respondent can also be a user.

The term "User-Customized Messages" refers to messages explicitly created by a user to express and describe a degree of responsiveness by respondents of user's messages, and wherein the user-customized messages are used by the method to automatically reply to a person or a group of people. The said term "User-Customized Messages" also refers to user-created messages that are personalized for a specific respondent. The term "Library of Messages" refers to a collection of various groups of user-customized messages, wherein each group of messages are describing/defining a specific degree of message responsiveness by respondents.

The term "Limit Response Feature" refers to an option offered by the method's software application to the user to constrain the automated response process to a limited number of responses to be sent by the method to the respondent based on time periods/ranges (e.g. the user programs the method's automated response process to only respond to a respondent's first 3 texts or emails in time periods of 48 hours, accordingly, the respondent will receive only 3 automated response messages in a 48 hour period). The term "Reply Time" refers to the time taken by a respondent to reply to a sender's message. The term "Time-Based Reply" refers to an automated response (via text and email) sent to a respondent based on the user-defined time-based scale and the respondent's reply time.

The term "Score" refers to a number (or a letter) that express and describe the degree of responsiveness by respondents based on respondents' reply time. The term "Score Range Values" refers to a range of score values organized in groups to grade the responsiveness of respondents. The term "Scored Message" refers to an automated response message with a numerical (or alphabetical) score value sent by the user's computing device to the respondent and to the user (a copy of the automated message).

The term "Texting" is an equivalent of the term "Electronic Text Messages", or "Electronic Messages", or simply "Messages", and also refers to the action of sending/receiving an electronic message. The term "Response Message" refers to a message that is responding/replying to a previously received message. The term "User-Categorized Messages" refers to a set of messages created by the user to be correlated to the respondents' reply times and the method's score system. The term "User-Customized Time Segments" refers to the time periods selected by the user to be correlated to the various user-created groups of message categories. The term "User-Defined Score System" refers to an alpha or numeric structure defined by the user to categorize messages, and to grade respondents. The term "User-Defined Scale" refers to a user-created measuring system to measure the reply time and the responsiveness of respondents.

The term "User-Defined Time-Based Scale" refers to a set of user-customized time segments to create a time-based scale to measure respondents' reply times. The term "User-Defined Time-Based Scales" refers to a plurality of scales, wherein a user assigns the said plurality of scales to a person and/or people to measure their messages' reply times. The term "Category-Specific Response Message" refers to a reply message belonging to a specific user-created classification that correlates to a specific time segment within the user-defined time-based scale and describes and defines with words the grade/rank of respondents' responsiveness.

The invention consists of a computerized time-based electronic text message and email response method to automatically reply to respondents of electronic text messages and emails with user-categorized and user-customized electronic text and email responses based on the respondent's reply time and user-defined time-based scales. The method is comprised of a user operating a computing device connected to a computer network with the capabilities to send and receive electronic text messages and emails. The method utilizes a software application created and installed to the said computing device by the user to process the method's instructions, operate the user-defined scale, to process the alpha and/or numeric based scoring calculations, and transmit the time-based user-customized electronic text and email reply messages (category-specific response messages) to the person (respondent) communicating with the user. Hence, the computerized time-based electronic text message and email response method is a computer software codified, computing device operated method to respond automatically to peoples' messages and to measure the respondents' responsiveness.

The method's automated response process is capable to be programmed by the user to automatically reply only to user-selected respondents (addressees). Thus, the method is capable to select/filter which people communicating with the user receive automated responses.

To be operational, the method requires the electronic text message contact information and email addresses of the person/people receiving automated response messages, a user-created library of categorized response messages (category-specific response messages), a user-defined score system, and a user-defined time range values for the time-base scale, to evaluate the respondents' responsiveness to the user's messages.

Once the automated response process is programmed, and all required data is entered/stored into the memory of the user's computing device, the said computing device is capable to send electronic text messages and emails, receive response messages (from the respondents of the user's sent electronic text messages or emails), and capable to create automated response messages for the respondents by selecting automatically, from a set of user-categorized messages (stored in the library), a message describing and indicating the category and the score of the respondent's text message or email response based on his/her reply time.

Once the automated response process selects the reply time-based response message, the method sends automatically (via the user's computing device), the selected scored text message or email response to the respondent to let him/her know the response score and to read the specific message correlated to the said response score. The method also sends to the user a copy of automated response message sent to the respondent.

Furthermore, the automated response process allows the user to utilize standardized reply messages for multiple respondents, or utilize different responses/messages and score values based on different time segments and respondents' reply times.

The user's computing device comprises of a processor, database, entry devices, displays, wireless transmission systems, electronic connection capabilities to the World Wide Web and the software to process the operation of the method and to store in a database the contact information and email addresses of the person/people to be correlated to the user-defined score system, and wherein a computer software is codified to operate the functioning of the method.

To conclude, the automated response process can be programmed to provide a Limit Response feature to restrain the method's automated response process to a limited number of responses sent to respondents based on user-defined time periods.

I claim:

1. A respondent-specific computerized electronic text message and email response method based on response times of individual respondents of electronic text messages and emails to automatically reply to the said individual respondents of electronic text messages and emails with user categorized and user-customized electronic text and email responses based on said individual respondent's response times to messages sent by a user, the method comprising: in response to receiving, by a computing device connected to a computer network with capabilities to send and receive electronic text messages and emails, a response message from a respondent: automatically measuring, by the computing device, level of message responsiveness of the respondent, wherein the measuring the level of message responsiveness comprises assigning score value to the response message sent by the respondent, wherein the response message is sent in response to a first message sent by the user, wherein the score value is determined based on user defined time based scale and response time value associated with the response message sent by the respondent, wherein the response time value is determined based on time taken by the respondent to reply to the first message; automatically correlating, by the computing device, the response time value to a specific time segment of the plurality of time segments defined in the user defined time based scale, wherein each segment of the plurality of time segments is associated with a corresponding category specific response message of a plurality of category specific response messages stored in a digital library of messages, wherein each of the plurality of category specific response messages describes a specific degree of message responsiveness of a plurality of degrees of message responsiveness by a message respondent, and belongs to a corresponding predefined classification of a plurality of predefined classifications, wherein each of the plurality of predefined classifications is specifically defined for a specific respondent of a plurality of potential respondents; automatically selecting, by the computing device, from the plurality of category specific response messages, a category specific response message associated with the specific time segment of the plurality of time segments, wherein the specific time segment is correlated with the response time value determined based on the time taken by the respondent to reply to the first message; automatically creating, by the computing device, a respondent specific response, wherein the respondent specific response is specific to the respondent, and created by combining the selected category specific response message and the assigned score value to the response message sent by the respondent; and automatically sending, by the computing device, the created respondent specific response to the respondent a predefined number of times within a predefined time period.

2. The respondent-specific computerized electronic text message and email response method of claim 1, wherein the user defined time-based scale is comprised of a set of user customized time segments to measure respondents' reply times.

3. The respondent-specific computerized electronic text message and email response method of claim 2, wherein each of the user customized time segments are correlated to a range of score values, and wherein the score values are comprised of an alpha, numeric and/or alphanumeric system created and defined by the user.

4. The respondent-specific computerized electronic text message and email response method of claim 1, wherein a collection of messages is created, defined, and categorized by the user to automatically reply to respondents through the method's computerized response process, and wherein the said collection of messages is correlated to time segments and score values.

5. The respondent-specific computerized electronic text message and email response method of claim 1, wherein the user creates a digital library to store composed collections of response messages, and wherein the user's computing device automatically selects from the said digital library a response message that corresponds to a respondent's reply times to an electronic text or email message.

6. The respondent-specific computerized electronic text message and email response method of claim 1, wherein the user's response messages are capable to be adapted to be standardized to reply to multiple respondents, and wherein the score values are capable to be adapted to be standardized for all respondents.

7. The respondent-specific computerized electronic text message and email response method of claim 1, wherein the method's automated response process is capable to be programmed by the user to automatically reply only to user-selected respondents.

8. The respondent-specific computerized electronic text message and email response method of claim 1, wherein the method is programmed by the user to be respondent specific, and provide every user-selected respondent with different responses/messages and score values based on different time ranges and respondents' reply times.

9. The respondent-specific computerized electronic text message and email response method of claim 1, wherein the user's computing device comprises of a processor, database, entry devices, displays, wireless transmission systems, electronic connection capabilities to the World Wide Web and the software to process the operation of the method and to store in a database the contact information and email addresses of the person/people to be correlated to the user-defined score system.

10. The respondent-specific computerized electronic text message and email response method of claim 1, wherein the method is performed by one or more processors executing computer instructions stored in non-transitory computer readable medium.

* * * * *